US012737335B2

(12) United States Patent
Yadav et al.

(10) Patent No.: US 12,737,335 B2
(45) Date of Patent: Sep. 15, 2026

(54) METHODS AND SYSTEMS FOR SECURING DATA CLONING AND SHARING OPTIONS ON DATA WAREHOUSES

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Sankuratri, Cupertino, CA (US); Danesh Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 474 days.

(21) Appl. No.: 18/100,574

(22) Filed: Jan. 24, 2023

(65) Prior Publication Data

US 2024/0028572 A1 Jan. 25, 2024

Related U.S. Application Data

(63) Continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*G06F 16/21* (2019.01)
*G06F 16/27* (2019.01)

(52) U.S. Cl.
CPC ............ *G06F 16/219* (2019.01); *G06F 16/27* (2019.01)

(58) Field of Classification Search
CPC ................................ G06F 16/219; G06F 16/27
See application file for complete search history.

(56) References Cited

U.S. PATENT DOCUMENTS

2014/0037133 A1* 2/2014 Bateman .......... H04N 21/23892 382/100
2023/0004582 A1* 1/2023 Barrett .................. G06F 16/903
2023/0050601 A1* 2/2023 Taylor ................... H04L 9/3242

* cited by examiner

*Primary Examiner* — Thaddeus J Plecha

(57) ABSTRACT

In one aspect, a computerized system for securing data cloning and sharing options on data warehouses, comprising: a clone determiner engine that determines that a data asset is a primary data asset or a clone data asset, wherein the clone determiner engine comprises: a log data analyzer that obtains and analyzes a set of logs of the data asset from a specified log source, and wherein set of logs are used to determine that the data asset is the primary data asset or the clone data asset, a timestamp analyzer engine that obtains a timestamp data of the data asset and reviews the timestamp data to analyze ordering of the data asset, and wherein the timestamp analyzer engine determines the data asset is a primary asset or a secondary asset, and a fingerprints analyzer that obtains and reviews the data asset and any metadata of data asset, and wherein the fingerprints analyzer creates a fingerprint based on a content of the data asset and the metadata of the data asset, and wherein the fingerprints analyzer then uses the fingerprints to determine that the data asset is the clone data asset of an already known asset in conjunction with an output of the timestamp analyzer engine and the log data analyzer.

20 Claims, 10 Drawing Sheets

ASSOCIATE WHETHER A DATA ASSET IS A CLONED COPY OR NOT
502

DETERMINE IF THE DATA ASSET IS A PRIMARY COPY OR NOT
504

PROVIDE WORKFLOWS TO USE CLONED AND/OR PRIMARY DATA ALONG WITH OTHER DIMENSIONAL ATTRIBUTES WITHIN THE RULES ENGINE
506

TRACK WHEN ANOTHER PARTY CLONES DATA AND OPENS UP THE CLONED DATA TO PUBLIC ACCESS
508

TRACK WHEN THE CLONED DATA IS EXPOSING DATA IN CLEAR TEXT INSTEAD OF AN ENCRYPTED PATH
510

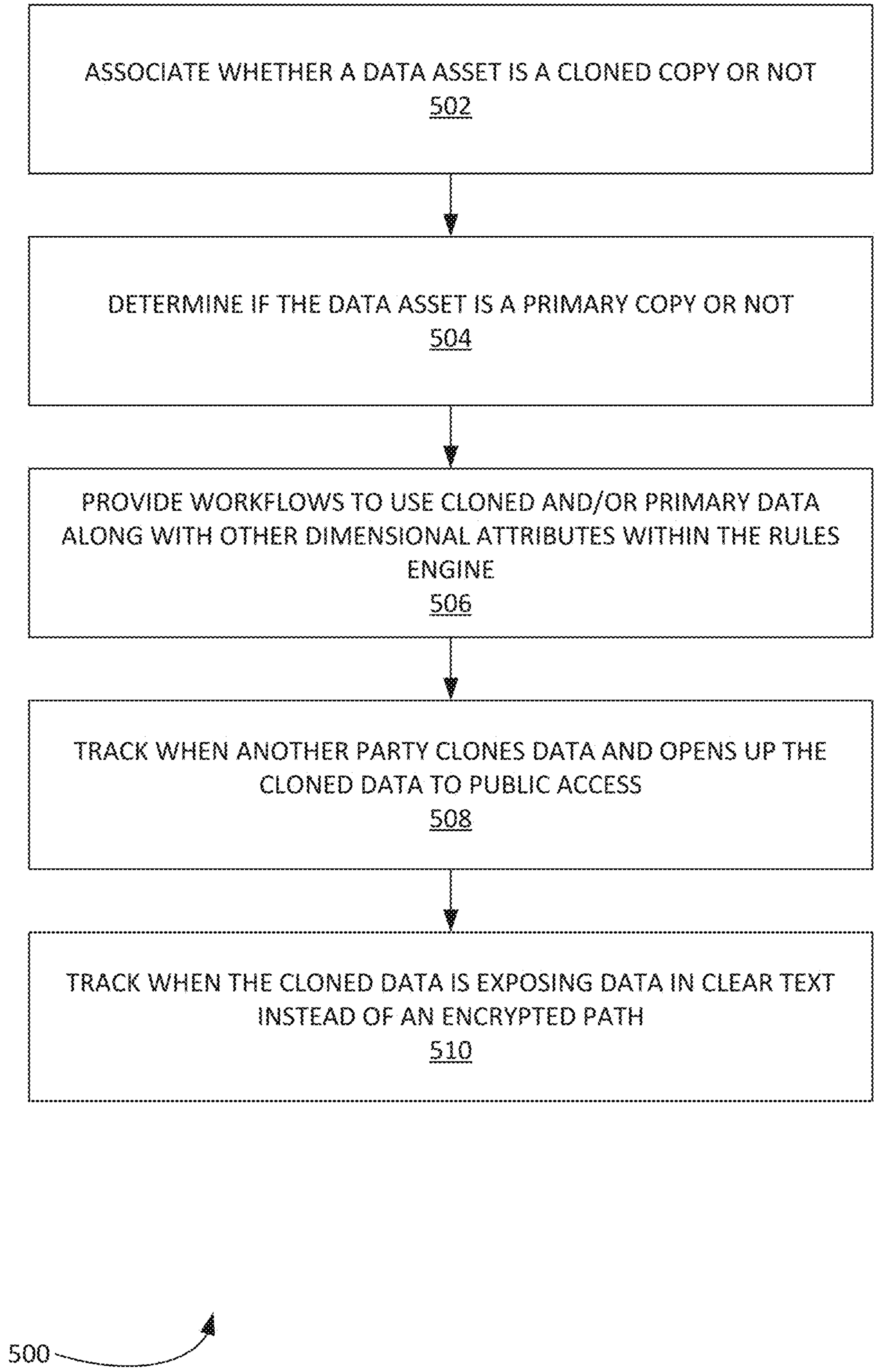

METHODS AND SYSTEMS FOR SECURING DATA CLONING AND SHARING OPTIONS ON DATA WAREHOUSES

CLAIM OF PRIORITY

This applications claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, securing data cloning and sharing options on data warehouses.

BACKGROUND

With data being consolidated and shared easily, it's a problem for security teams to provision the right roles, and the right permissions within a role. Additionally, Database as a Service (DBaaS) is becoming very popular in modern-day application architectures. Many applications are built directly on databases which are consumed as a service. As this consolidation onto SaaS data stores happens, many enterprises consolidate their data across business use-cases into a single SaaS Database. In such a scenario, similar to what happens when all the data is stored at the same location, multiple internal and external teams gain access. Cloud computing-based data warehousing systems (e.g., Snowflake® and/or a similar type of system) can make it very easy for sharing data within internal and external teams.

Data sharing can go wrong. Firewalls, CASBs, and CSPMs may not help with data sharing if the inherent information is misrepresented and shared with clones. Accordingly, there is a need for an approach that addresses cloning policies, keeping track of integrity, and ensuring any data created from a copy and shared is tracked to address data abuse issues. Addressing data-sharing security issues can then enable enterprises to build on new business models on third-party data and use data stores that can be shared effectively.

SUMMARY OF THE INVENTION

In one aspect, a computerized system for securing data cloning and sharing options on data warehouses, comprising: a clone determiner engine that determines that a data asset is a primary data asset or a clone data asset, wherein the clone determiner engine comprises: a log data analyzer that obtains and analyzes a set of logs of the data asset from a specified log source, and wherein set of logs are used to determine that the data asset is the primary data asset or the clone data asset, a timestamp analyzer engine that obtains a timestamp data of the data asset and reviews the timestamp data to analyze ordering of the data asset, and wherein the timestamp analyzer engine determines the data asset is a primary asset or a secondary asset, and a fingerprints analyzer that obtains and reviews the data asset and any metadata of data asset, and wherein the fingerprints analyzer creates a fingerprint based on a content of the data asset and the metadata of the data asset, and wherein the fingerprints analyzer then uses the fingerprints to determine that the data asset is the clone data asset of an already known asset in conjunction with an output of the timestamp analyzer engine and the log data analyzer.

BRIEF DESCRIPTION OF THE DRAWINGS

FIG. 5 illustrates an example process for securing data cloning and sharing options on data warehouses, according to some embodiments.

Figure 1:
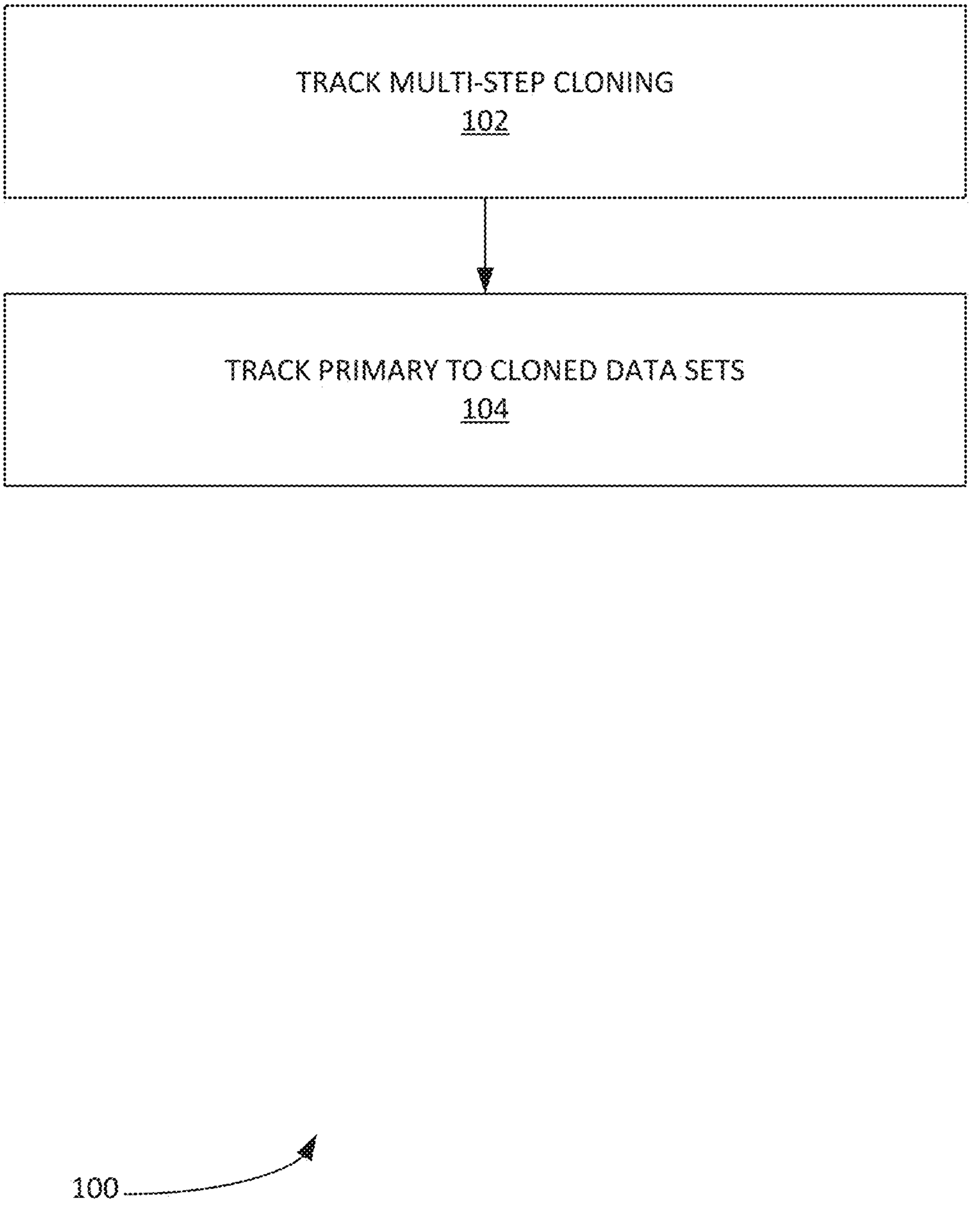
FIG. 1 illustrates an example process for securing data cloning and sharing options on data warehouses, according to some embodiments.

The Figures described above are a representative set and are not exhaustive with respect to embodying the invention.

DESCRIPTION

Disclosed are a system, method, and article for securing data cloning and sharing options on data warehouses. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

DBaaS (Database as a Service) can be a cloud computing service that provides access to and use a cloud database system.

Data cloning creates a copy of data asset/set for backup, analysis, and/or other purposes.

Data definition language (DDL) is a syntax for creating and modifying database objects such as tables, indices, and users. DDL statements can be used to define data structures (e.g. database schemas).

Data manipulation language (DML) can be a family of computer languages used by computer programs or database users to retrieve, insert, delete, and update data in a database.

Data warehouse can be a system used for reporting and data analysis and is considered a core component of business intelligence.

Fuzzy hashing can be a compression function used for calculating a similarity between one or more digital files. Fuzzy hashing can be used to automate grouping similar malware.

Fuzzy hashing can be used to determine a difference between two files by comparing a similarity of relevant outputs.

Shadow data can be any data that is not organized by or subject to an entity's data management system.

Software as a service (SaaS) is a software licensing and delivery model in which software is licensed on a subscription basis and is centrally hosted.

ssdeep can be used to compute fuzzy hashes (e.g. a context triggered piecewise hashes (CTPH)). Fuzzy hashes can match inputs with homologies. These inputs can include sequences of identical bytes in the same order. It is note that bytes in between the sequences can vary in in content, length, etc.

Virtual private cloud (VPC) can be an on-demand configurable pool of shared resources allocated within a public cloud environment, providing a certain level of isolation between the different organizations using the resources.

Example Methods

FIG. 1 illustrates an example process 100 for securing data cloning and sharing options on data warehouses, according to some embodiments. Process 100 can track cloning and includes workflows that use cloning alongside all other capabilities. The clone determinism is based on a clone detection engine managed by process 100. The clone detection engine uses features from looking at logs. The clone detection engine understands timestamps to examine hashes and fingerprints for a given data asset.

In step 102, process 100 can track multi-step cloning. Data is fluidic (e.g. the data is easy to clone data) and accordingly, with a cloned copy a secondary copy can be duplicated. When this process happens over multiple cycles, tracking the copies back to the original data version may become an issue.

Figure 2:
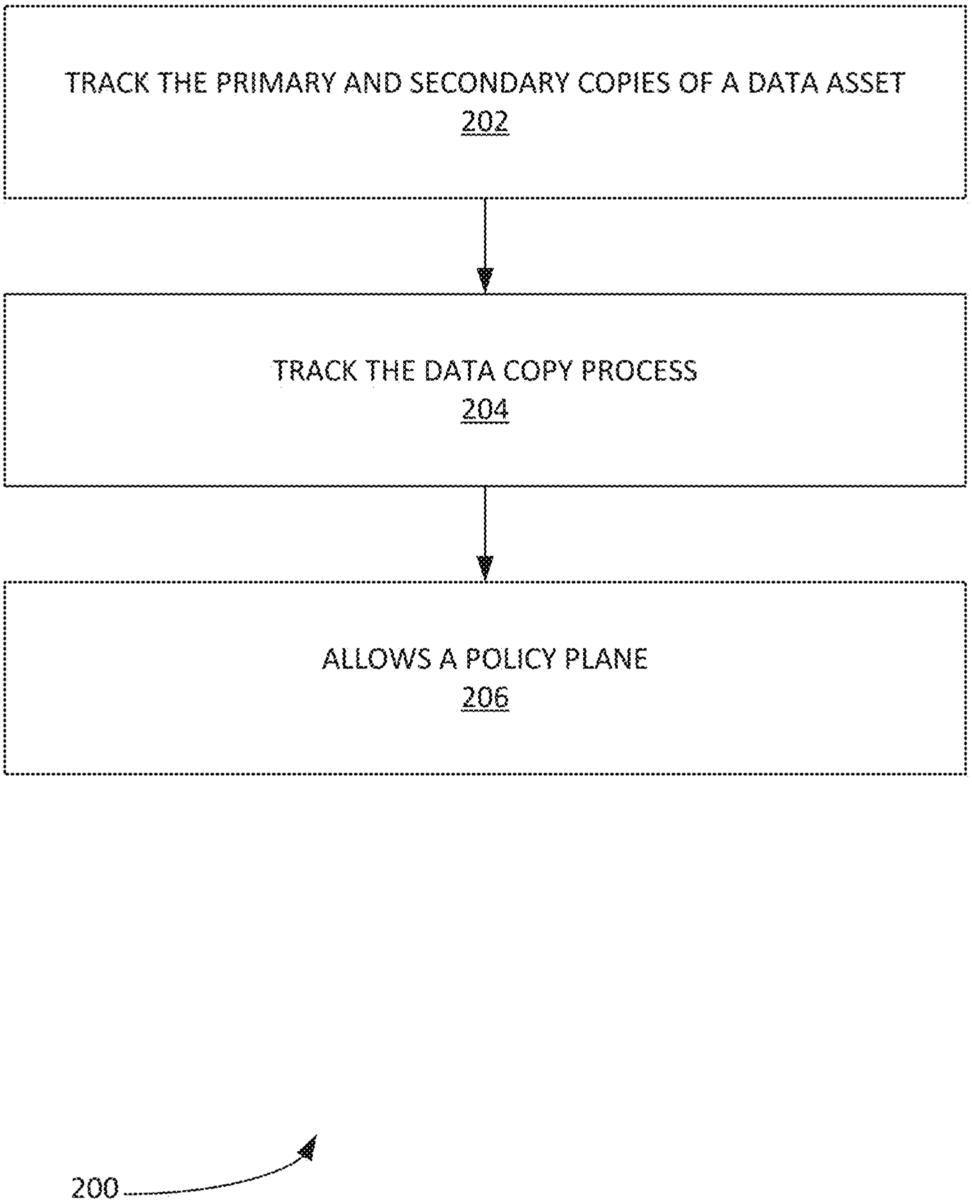
FIG. 2 illustrates an example process for tracking multi-step cloning, according to some embodiments.

FIG. 2 illustrates an example process 200 for tracking multi-step cloning, according to some embodiments. In step 202, process 200 tracks the primary and secondary copies of a data asset. In step 204, process 200 tracks the data copy process. In step 206, process 200 allows a policy plane. In the policy plane, rules can be described based on the data being a primary or a secondary copy. It is noted that existing security vendors (e.g. Firewalls, CASB, CSPM tools, etc.) are not aware of cloned aspects of data assets. Accordingly, these security vendors are not capable of tracking data security in the context of cloned data.

In step 104, process 100 can track primary to cloned data sets.

Figure 3:
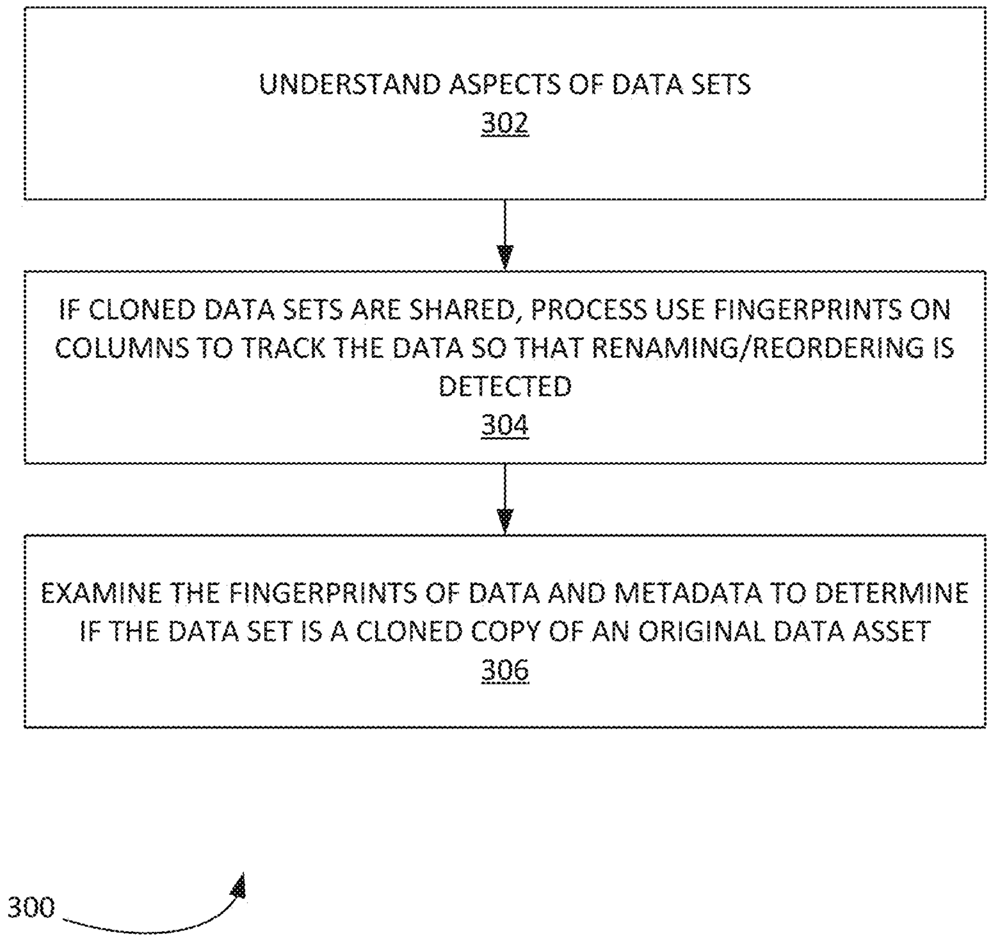
FIG. 3 illustrates an example process for tracking primary to cloned data sets, according to some embodiments.

FIG. 3 illustrates an example process 300 for tracking primary to cloned data sets, according to some embodiments. It is noted that tracking of a data asset being primary or secondary can be complicated. In step 302, process 300 can understand aspects of data sets.

Figure 4:
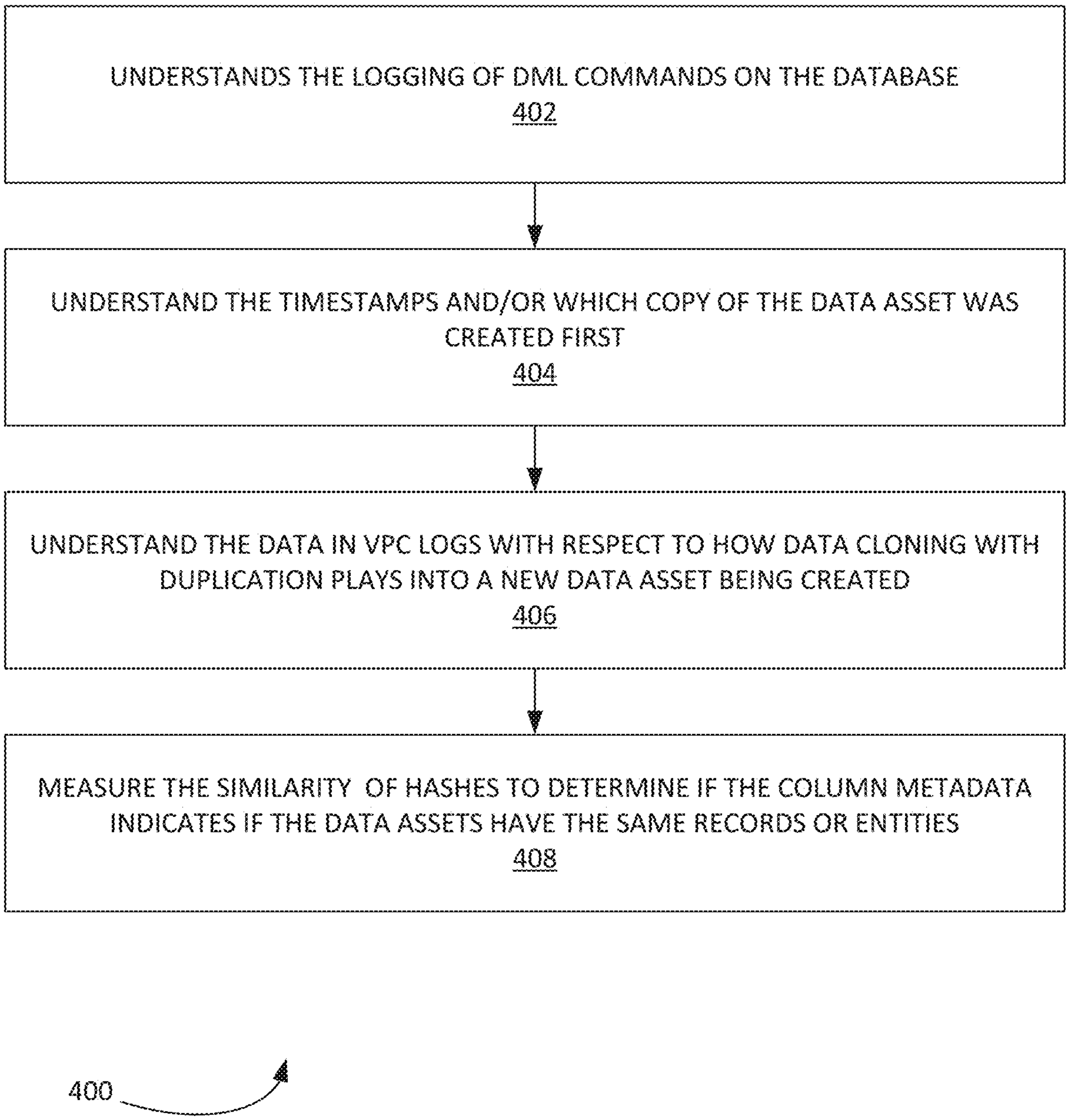
FIG. 4 illustrates an example process for understanding aspects of a data sets for tracking, according to some embodiments.

FIG. 4 illustrates an example process 400 for understanding aspects of a data sets for tracking, according to some embodiments. In step 402, process 400 understands the logging of DML (data manipulation language) commands on the database. In step 404, process 400 understands the timestamps and/or which copy of the data asset was created first. In step 406, process 400 understands the data in VPC logs with respect to how data cloning with duplication plays into a new data asset being created. In step 408, process 400 can measure the similarity of hashes to determine if the column metadata indicates if the data assets have the same records or entities.

Returning to process 300, in step 304, if cloned data sets are shared, process use fingerprints on columns to track the data so that renaming/reordering is detected. In step 306, process 300 examines the fingerprints of data and metadata to determine if the data set is a cloned copy of an original data asset.

FIG. 5 illustrates an example process 500 for securing data cloning and sharing options on data warehouses, according to some embodiments. In step 502, process 500 can associate whether a data asset is a cloned copy or not. In step 504, process 500 can determine if the data asset is a primary copy or not.

Figure 6:
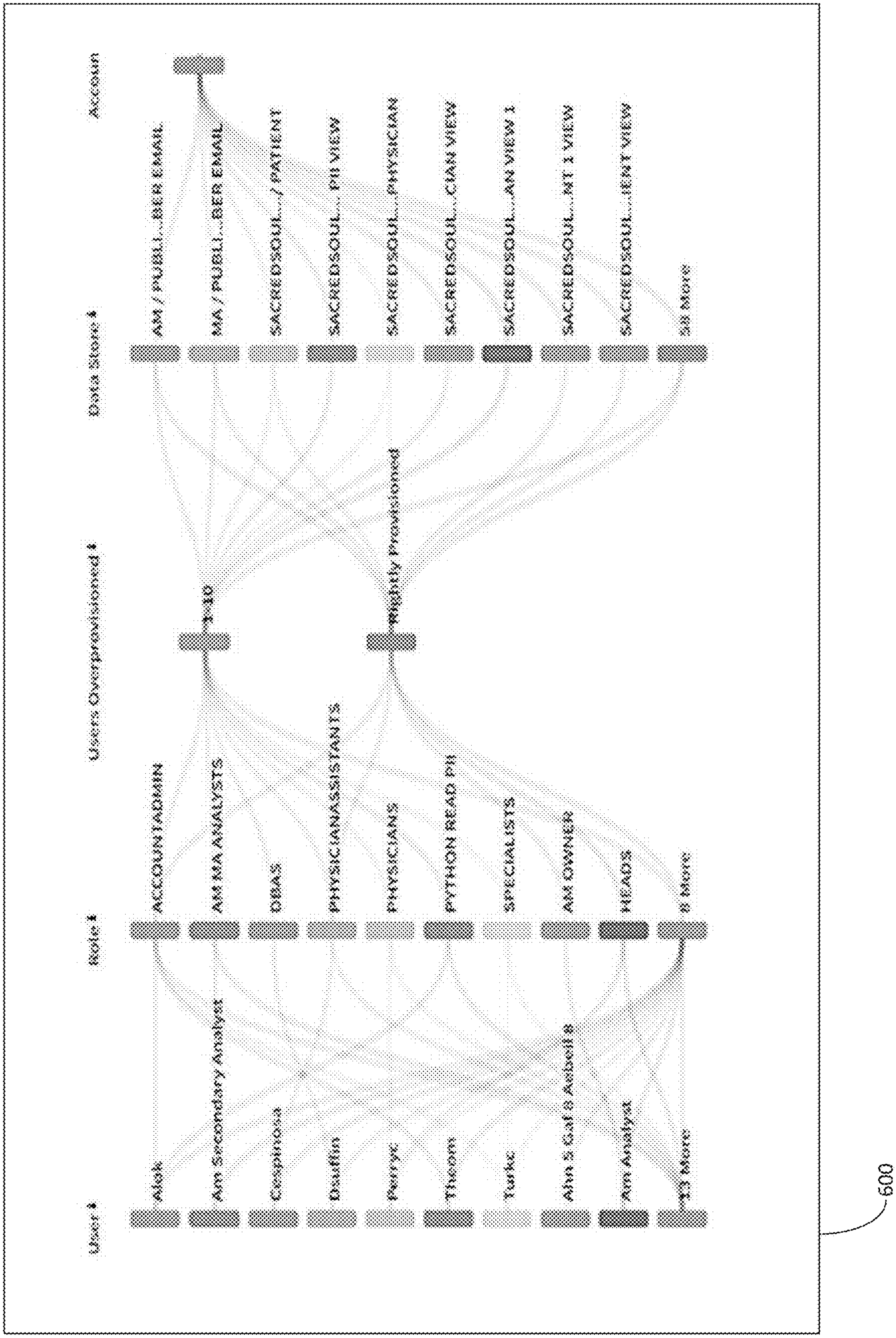
FIGS. 6 and 7 illustrates an example screen shot showing a dashboard, according to some embodiments.
Figure 7:
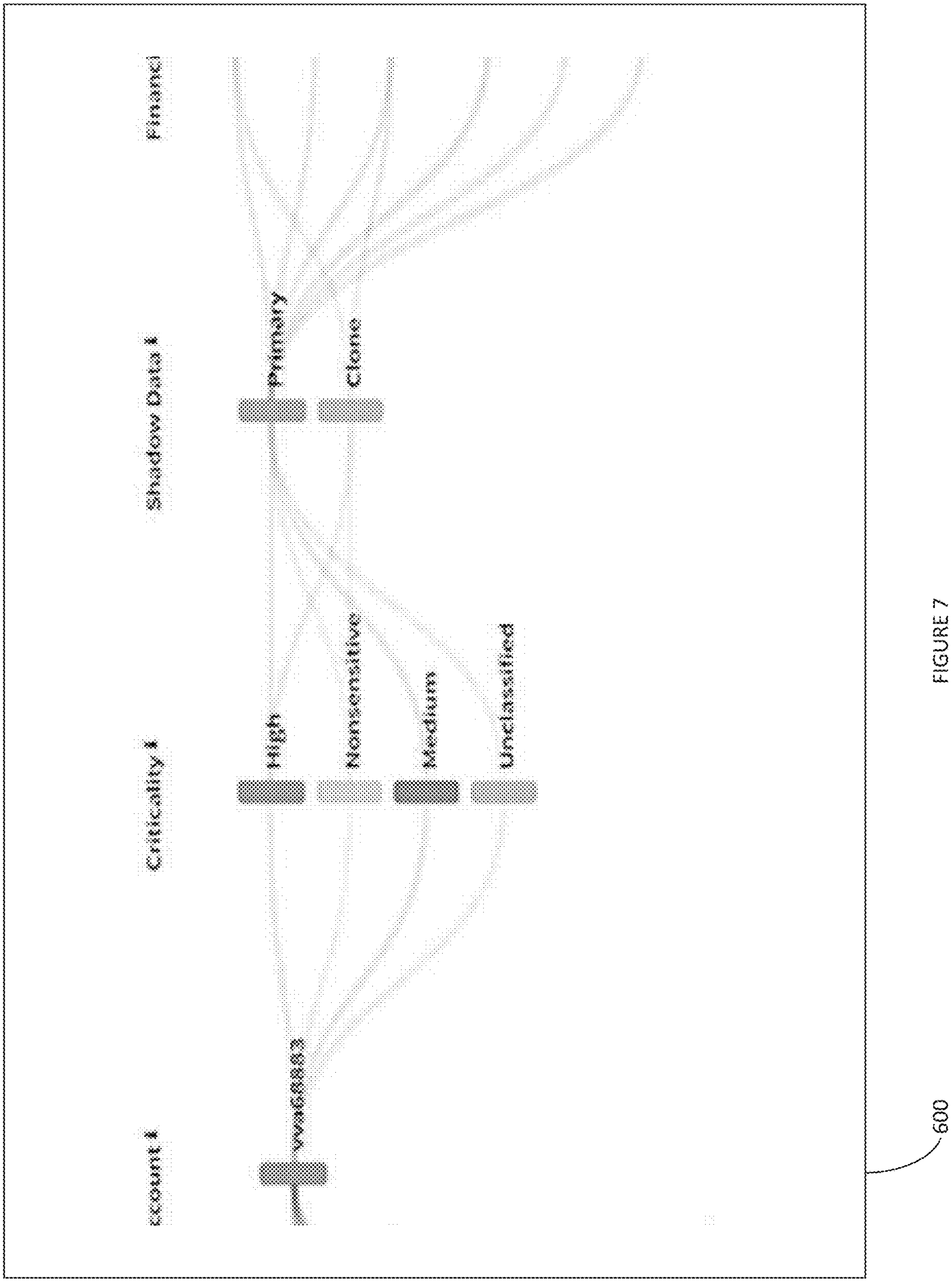

FIGS. 6 and 7 illustrates an example screen shot 600 showing a dashboard, according to some embodiments. Shadow data indicates cloned data that the enterprise is not using outside of the usual security and governance controls.

In step 506, process 500 provides workflows to use cloned and/or primary data along with other dimensional attributes within the rules engine 904. The other dimensional attributes include, inter alia: access attributes, security attributes, etc. These can include user and/or machine identities for accessing data. These can include security attributes like encrypted or public access that impact cloning as well.

In step 508, process 500 can track when another party (e.g. an ill-intentioned actor) clones data and opens up the cloned data to public access. In step 510, process 500 track when the cloned data is exposing data in clear text instead of an encrypted path.

Figure 8:
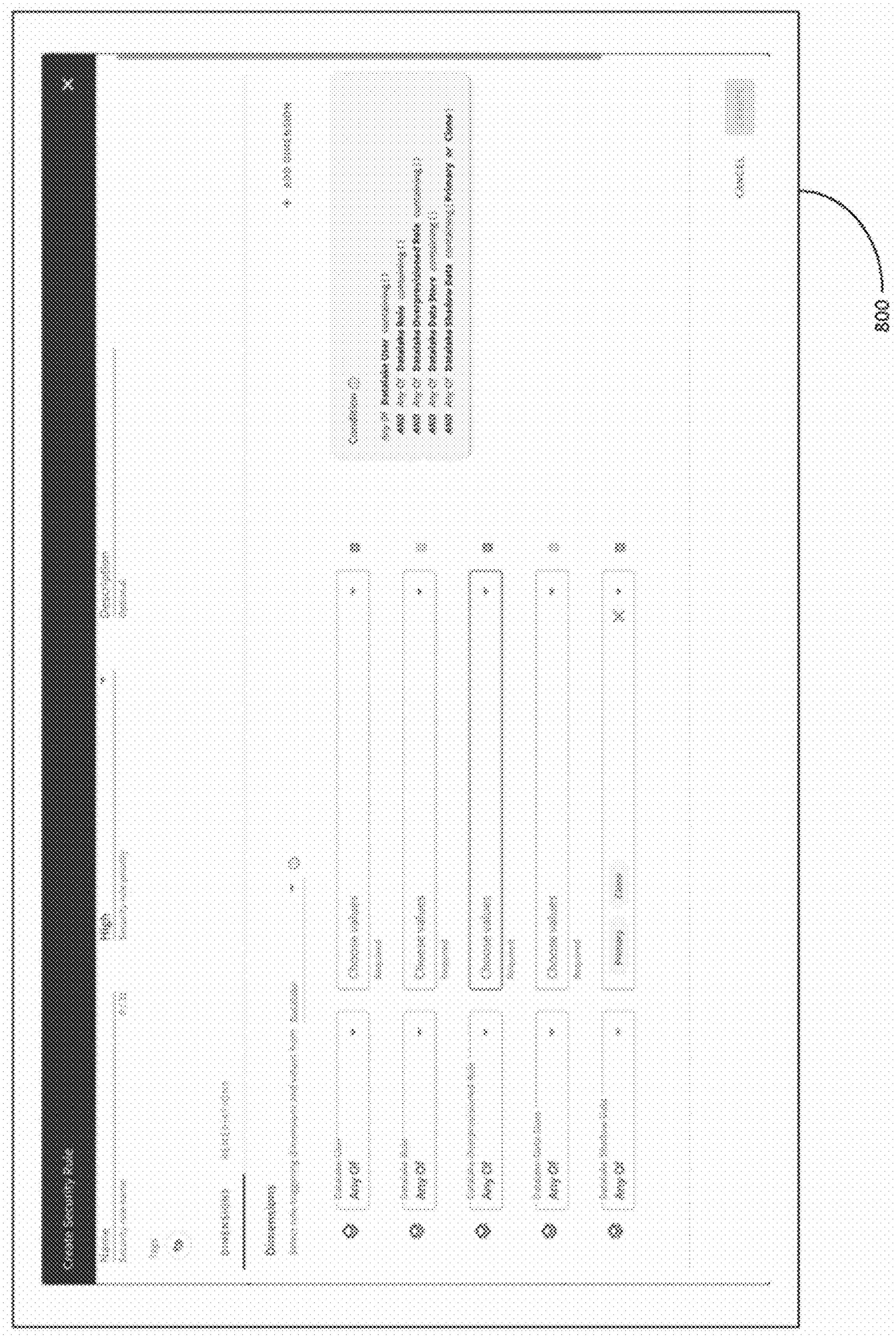
FIG. 8 illustrates an example screen shot view used for creating a security rule, according to some embodiments.

FIG. 8 illustrates an example screen shot view 800 used for creating a security rule, according to some embodiments.

Figure 9:
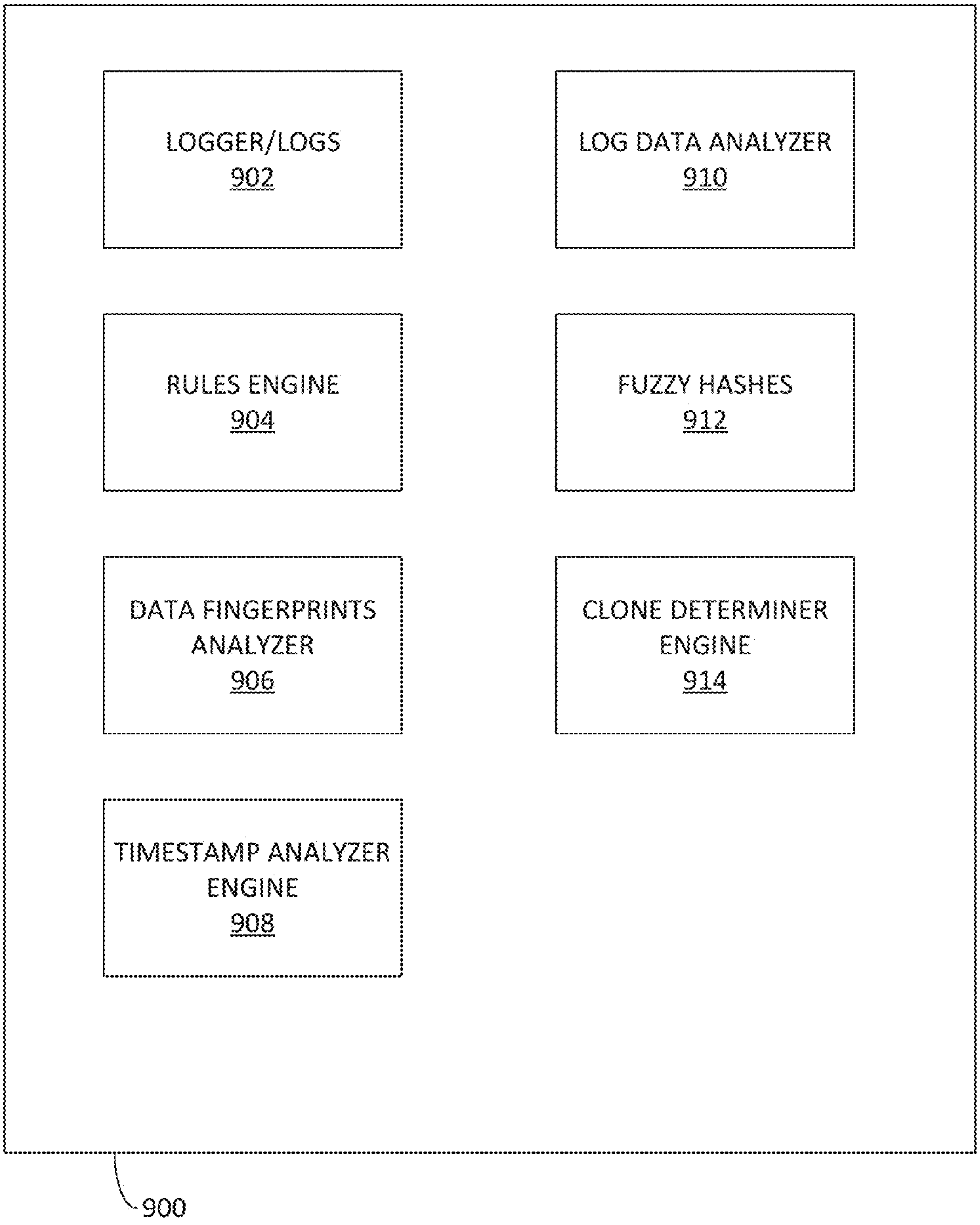
FIG. 9 illustrates an example system for securing data cloning and sharing options on data warehouses, according to some embodiments.

FIG. 9 illustrates an example system 900 for securing data cloning and sharing options on data warehouses, according to some embodiments. Log data (e.g. DML/DDL logs, VPC logs, Cloudtrain®, Appln®, etc.). System 900 can include a clone determiner engine that can determine if the given data asset is a primary data asset or a clone data asset. System 900 can include three input components and analyses the data to determine if a given data asset is a primary or a cloned copy.

The three input components include a log data analyzer 908. Log data analyzer 908 analyzes data from the various log resources. These sources can include, inter alia: DDL/DML logs for data bases and data warehouses, VPC logs or equivalent data in the clouds for determining if resources are being cloned or not.

Timestamp analyzer engine 906 can be an analysis engine. Timestamp analyzer engine 906 can review the timestamp data to analyze ordering. Timestamp analyzer engine 906 can determine if a data set is primary or secondary.

Fingerprints analyzer 904 review the data and metadata for every data asset. Fingerprints analyzer 904 creates a fingerprint based on the contents of data. Fingerprints analyzer 904 then uses these fingerprints to determine if a new data asset is a cloned copy of an already known asset in conjunction with timestamp analyzer engine 906 and log data analyzer 908. A fingerprint is built using fuzzy hashes 912. Fuzzy Hash (e.g. of data records) becomes the fingerprint for a given data asset. System 900 can use a variant of ssdeep fuzzy hashing to build a fingerprint that is looked up to determine similarity.

A clone determiner engine 914 can obtain the outputs of the other modules of system 900. Clone determiner engine 914 can determine if a data asset is a primary data or a clone.

System 900 provides a security that can address data governance and detection of active threats, being aware of data sharing and cloning that may be needed by the business. System 900 can weave in security posture which understands if data is being shared correctly or not. System 900 can determine whether clone data postures are with the right security or not.

Additional Computing Systems

Figure 10:
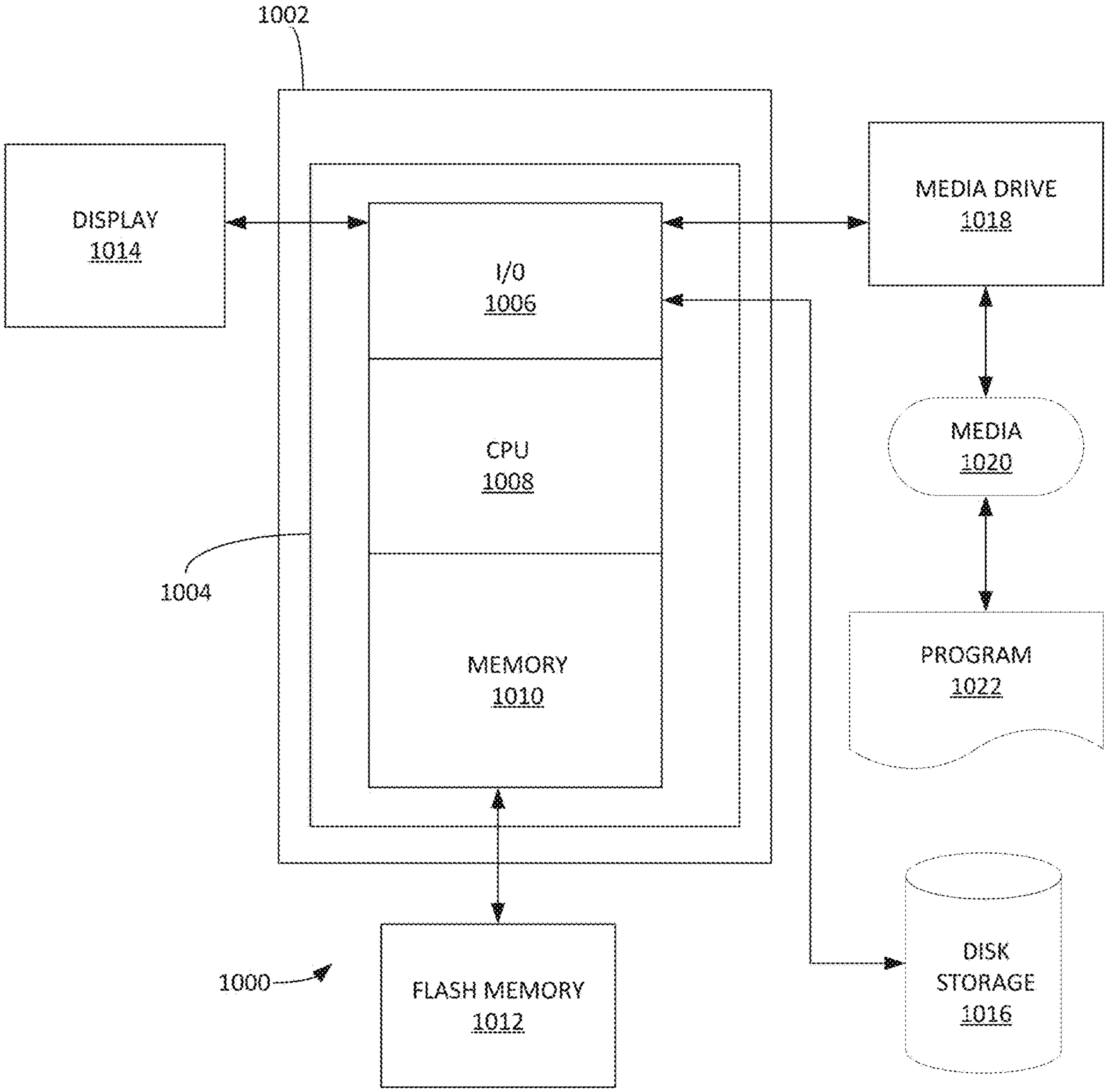
FIG. 10 depicts an exemplary computing system that can be configured to perform any one of the processes provided herein.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

FIG. 10 depicts computing system 1000 with a number of components that may be used to perform any of the processes described herein. The main system 1002 includes a motherboard 1004 having an I/O section 1006, one or more central processing units (CPU) 1008, and a memory section 1010, which may have a flash memory card 1012 related to it. The I/O section 1006 can be connected to a display 1014, a keyboard and/or another user input (not shown), a disk storage unit 1016, and a media drive unit 1018. The media drive unit 1018 can read/write a computer-readable medium 1020, which can contain programs 1022 and/or databases. Computing system 1000 can include a web browser. Moreover, it is noted that computing system 1000 can be configured to include additional systems in order to fulfill various functionalities. Computing system 1000 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized system for securing data cloning and sharing options on data warehouses including a computing system having a processor and a memory, the computing system implementing:

a clone determiner engine that determines that a first data asset is a primary data asset or a clone data asset, wherein the clone determiner engine comprises:

a log data analyzer that obtains and analyzes a set of logs of the first data asset from a specified log source, and wherein set of logs are used to determine that the first data asset is the primary data asset or the clone data asset, a timestamp analyzer engine that obtains a timestamp data of the first data asset and reviews the timestamp data to analyze ordering of the first data asset, and wherein the timestamp analyzer engine is used to determine that the first data asset is the primary asset or a secondary asset, and a fingerprints analyzer that obtains and reviews the data asset and any metadata of data asset, and wherein the fingerprints analyzer creates a fingerprint based on a content of the data asset and the metadata of the data asset, and wherein the fingerprints analyzer then uses the fingerprints to determine that the data asset is the clone data asset of an already known asset in conjunction with an output of the timestamp analyzer engine and the log data analyzer.

2. The computerized system of claim 1, wherein the specified log source comprises a data definition language (DDL) log for a data base or a data warehouse.

3. The computerized system of claim 1, wherein the specified log source comprises a data manipulation language (DML) log for a data base or a data warehouse.

4. The computerized system of claim 1, wherein the specified log source comprises a Virtual private cloud (VPC) log of a cloud computing platform.

5. The computerized system of claim 1, wherein the fingerprint for the first data asset is built using a fuzzy hash.

6. The computerized system of claim 5, wherein the fingerprint is built using a ssdeep fuzzy hash.

7. The computerized system of claim 6, wherein the ssdeep fuzzy hash is used to determine a second data asset is with a clone of the first data asset.

8. The computerized system of claim 1, wherein the clone determiner engine tracks multi-step cloning by tracking copies of the clone data asset back to the primary data asset across multiple cloning cycles.

9. The computerized system of claim 1, wherein the fingerprints analyzer creates fingerprints on columns of the first data asset to detect renaming or reordering of the first data asset relative to an original data asset.

10. The computerized system of claim 1, wherein the clone determiner engine detects when the clone data asset is opened to public access.

11. The computerized system of claim 10, wherein the clone determiner engine further detects when the clone data asset is exposed in clear text instead of through an encrypted path.

12. The computerized system of claim 1, wherein the system identifies shadow data comprising cloned data of the first data asset that exists outside of security and governance controls of an enterprise.

13. A computerized method for securing data cloning and sharing options on data warehouses, the method comprising:

obtaining, by a log data analyzer executed by a processor, a set of logs of a first data asset from a specified log source, wherein the set of logs are used to determine that the first data asset is a primary data asset or a clone data asset;

obtaining, by a timestamp analyzer engine executed by the processor, a timestamp data of the first data asset and reviewing the timestamp data to analyze ordering of the first data asset, wherein the timestamp data is used to determine an ordering relationship between the first data asset and other data assets;

obtaining, by a fingerprints analyzer executed by the processor, the first data asset and metadata of the first data asset, and creating a fingerprint based on a content of the first data asset and the metadata of the first data asset; and determining, by a clone determiner engine executed by the processor, that the first data asset is the primary data asset or the clone data asset of an already known asset based on the fingerprint in conjunction with an output of the timestamp analyzer engine and the log data analyzer.

14. The computerized method of claim 13, wherein the specified log source comprises at least one of: a data definition language (DDL) log for a data base or a data warehouse, a data manipulation language (DML) log for the data base or the data warehouse, or a Virtual private cloud (VPC) log of a cloud computing platform.

15. The computerized method of claim 13, wherein creating the fingerprint comprises building the fingerprint using a ssdeep fuzzy hash.

16. The computerized method of claim 13, further comprising tracking, by the clone determiner engine, multi-step cloning by tracking copies of the clone data asset back to the primary data asset across multiple cloning cycles.

17. The computerized method of claim 13, further comprising detecting, by the clone determiner engine, when the clone data asset is opened to public access or is exposed in clear text instead of through an encrypted path.

18. A non-transitory computer-readable medium storing instructions that, when executed by a processor, cause the processor to perform operations for securing data cloning and sharing options on data warehouses, the operations comprising:

obtaining and analyzing a set of logs of a first data asset from a specified log source, wherein the set of logs are used to determine that the first data asset is a primary data asset or a clone data asset;

obtaining a timestamp data of the first data asset and reviewing the timestamp data to analyze ordering of the first data asset, wherein the timestamp data is used to determine an ordering relationship between the first data asset and other data assets;

obtaining and reviewing the first data asset and any metadata of the first data asset, and creating a fingerprint based on a content of the first data asset and the metadata of the first data asset; and determining that the first data asset is the primary data asset or the clone data asset of an already known asset based on the fingerprint in conjunction with an output of the analyzing of the set of logs and the reviewing of the timestamp data.

19. The non-transitory computer-readable medium of claim 18, wherein the operations further comprise creating fingerprints on columns of the first data asset to detect renaming or reordering of the first data asset relative to an original data asset.

20. The non-transitory computer-readable medium of claim 18, wherein the operations further comprise identifying shadow data comprising cloned data of the first data asset that exists outside of security and governance controls of an enterprise.

* * * * *